Patented Dec. 15, 1925.

1,565,328

UNITED STATES PATENT OFFICE.

ARTHUR B. RAY, OF FLUSHING, NEW YORK, ASSIGNOR TO CARBIDE AND CARBON CHEMICALS CORPORATION, A CORPORATION OF NEW YORK.

POROUS MASS AND PROCESS OF PREPARING THE SAME.

No Drawing. Application filed October 28, 1921. Serial No. 511,171.

REISSUED

*To all whom it may concern:*

Be it known that I, ARTHUR B. RAY, a citizen of the United States, residing at Flushing, in the county of Queens and State of New York, have invented certain new and useful Improvements in Porous Masses and Processes of Preparing the Same, of which the following is a specification.

This invention relates to porous materials suitable for use in the treatment of fluids and to processes of preparing such materials. More specifically, the invention involves the provision of a rigid porous mass adapted for use in the purification and storage of gases and for other purposes. One of the principal objects of the invention is to provide an improved filling for receptacles intended for the storage and transportation of dissolved acetylene.

It has heretofore been proposed to utilize porous materials, with or without binding agents, for the purposes above mentioned. Fragmentary material is objectionable because of its tendency to settle, and, so far as I am aware, most of the binders previously suggested have been non-absorptive and in many cases subject to deterioration in the connection in which they are used. In distinction to this, products prepared according to my invention are rigid, inert and characterized by absorptive capacity in both the fragmentary material and the binding agent. Generally speaking, such products consist of an aggregate of fragments of porous absorbent material cemented together by a coherent carbonaceous residue which is also porous and absorbent.

In some cases, however, non-carbonaceous binders may be used, and a typical example of such use will be described hereinafter.

A preferred method of forming the carbon-bonded absorbent mass is first to mix the fragments of absorbent material with a decomposable substance capable of giving a coherent and adherent carbonaceous residue on decomposition and then to decompose the substance so that its carbonaceous residue will firmly bind together the absorbent fragments. The materials used may be so chosen that the final product will be strong and capable of withstanding shocks of considerable violence and yet will be highly porous.

The absorbent fragments in the agglomerate may advantageously consist of charcoal. In this case, the binding material and the bound particles will be of similar composition but will differ in origin. Ordinary charcoal may be used or the fragments to be agglomerated may be formed in a preliminary step so as to combine to the highest possible degree porosity and crushing strength, in a manner to be described, while the carbonaceous binder formed in a later stage will be selected with a view to porosity and the adherent and coherent properties necessary for a proper cementing action.

It is known that most organic substances leave a carbonaceous residue on thermal decomposition and any one of a number of such substances may be selected to produce the bonding carbon. To secure a proper distribution of the bonding agent, it is desirable that the carbonaceous material should be in liquid state at some time before it is fully decomposed. This is accomplished by using a solution, or by using a fusible decomposable substance. Of course, a fusible substance in solution may be used.

As organic compounds for producing the bonding carbon, carbohydrates have many advantages. These substances usually fuse before or during thermal decomposition and are generally quite soluble in water. Sugars, especially the cheap and very soluble sugars, are satisfactory carbohydrates. Bituminous and resinous materials may be used in some cases for producing the bonding carbon.

When charcoal is used as the fragmentary material, any grade of reasonable porosity may be selected and bonded with a carbonaceous material of the type above indicated. For example, charcoal fragments may be stirred into a concentrated sugar solution until a pasty mass is obtained and this may be subjected to heat in a suitable container provided with a vent for the water vapor and gases expelled during the decomposition of the binder. It is preferred to raise the heat by stages to a point somewhat above the temperature at which the sugar completely decomposes. The resulting mass is strongly coherent and has satisfactory absorptive capacity.

In order to provide a mass of especially high porosity, I follow the procedure now to be outlined, selecting as the porous material a highly absorptive charcoal, or in the preferred form of the invention, the material known as activated carbon. It is well recognized that the porosity and special absorptive and adsorptive power of such materials may be readily impaired, but by the treatment specified I have discovered that a bonded mass may be obtained without material lessening of these properties.

The following specific example will serve to illustrate this phase of the invention: Charcoal, such as white pine charcoal which has been calcined at 500° C. until practically free from extractable matter, is crushed to such fineness that it will pass a six mesh screen and stay on a 100 mesh screen. Cane sugar is mixed with the characoal fragments in the proportion of about three parts by weight of sugar to two parts of charcoal. Preferably the sugar is made into a syrup with water before mixing it with the charcoal. The mixture is plastic at this stage and is packed tightly by bumping and tamping into the containers in which the sugar is to be decomposed. The containers are closed with the exception of one or more small outlets for gases and are subjected to heat, the temperature being increased at the rate of 50° C. per hour until 450° C. is attained, this temperature being continued for about four hours. If water has been used in the mixture, this is first expelled and the sugar remains in molten state. At a higher temperature the molten sugar begins to decompose and the gases evolved by its decomposition will cause the material to completely fill the receptacle. As the sugar tends to increase in volume during decomposition, no objectionable cavities are formed in the mass. The carbonaceous residue of the sugar strongly binds the charcoal fragments together and is highly porous, while the porosity of the charcoal particles is not considerably reduced during the process. The resulting mass has sufficient mechanical strength to resist crushing under considerable compressive force. Glucose and other sugars may be used instead of cane sugar, either with or without the addition of water.

In the form of the invention which I now regard as preferable, the material known as "activated carbon" is substituted for the charcoal employed in the specific example given above. Activated carbon may be prepared from charcoal or from a denser carbonaceous material, such as bituminous or anthracite coal. It differs from what is commonly referred to as charcoal in that it has an adsorptive capacity of higher and entirely different order, due to the fact that it is prepared from a material having an active (adsorptive) carbon base, this base being substantially freed from adsorbed hydrocarbons by differential oxidation during the activating process.

Activated carbon and processes of making it are described in detail in United States Patent to Newcomb K. Chaney No. 1,497,543, June 10, 1924. The present invention is applicable to activated carbon prepared in any manner.

In baking the mass to which the binder has been added, the procedure should be such that the adsorptive properties of the carbon are not destroyed by clogging it with hydrocarbons or inactive carbon. The binder and baking schedule mentioned in the specific example are suitable for preserving the adsorptive capacity of the carbon. Because of its greater porosity, activated carbon prepared from highly porous materials, such as charcoal, is preferable for producing an absorbent mass.

When the mass is designed as a filling material for acetylene cylinders, it may be formed into blocks in suitable molds and these blocks then packed in a storage tank in the same manner that porous blocks have heretofore been packed in such vessels. However, I prefer to form the mass directly in the acetylene storage tank as this is simpler and insures complete freedom from objectionable cavities. The tanks are not injuriously affected by the temperatures used in the baking operation.

When used as a filling mass for acetylene cylinders the material prepared in accordance with the above has important advantages. Its strength and rigidity prevent the formation of objectionable cavities during the filling, testing and discharging operations, or by the shocks incidental to transportation and use, even after long periods of time. The entire mass is essentially carbon and is therefore non-reactive toward all acetylene solvents, and is capable of withstanding high temperatures without decomposition or volatilization of any of its constituents.

While in the preferred form of my invention fragmentary activated carbon is bonded with carbonaceous material, good results may be obtained by the use of other binders. The absorptive capacity of activated carbon is so great that this property in the bonding material need not be of a high order, and the invention includes the bonding of activated carbon with any agglomerated material not substantially diminishing its activity. For example, satisfactory fillers for acetylene storage cylinders may be prepared by mixing activated carbon particles with cement of the type of Portland cement, adding water and allowing the mass to set. The composition may be molded into the desired shape or may be placed in the cylinder while plastic. Suitable materials, such as kieselguhr and fibrous asbestos, may be mixed with the absorptive carbon.

I claim:

1. A process of preparing a porous filling material for acetylene storage tanks, which comprises bonding fragmentary activated carbon with a bonding agent not substantially impairing its absorptive capacity.

2. A process of preparing a porous filling material for acetylene storage tanks, which comprises mixing fragmentary activated carbon with a substance yielding carbon on thermal decomposition, and applying regulated heat to decompose said substance.

3. As a filling for acetylene storage tanks, a rigidly bonded body consisting of fragmentary activated carbon associated with a carbonaceous binder yielding carbon and expanding when thermally decomposed.

In testimony whereof, I affix my signature.

ARTHUR B. RAY.